United States Patent

[11] 3,609,568

[72] Inventor Leland Brooks Jackson
Monsey, N.Y.
[21] Appl. No. 44,357
[22] Filed June 8, 1970
[45] Patented Sept. 28, 1971
[73] Assignee Bell Telephone Laboratories, Incorporated
Murray Hill, Berkeley Heights, N.J.

[54] STABLE DIGITAL FILTER APPARATUS

17 Claims, 6 Drawing Figs.

[52] U.S. Cl. .......... 328/167, 328/159, 235/156
[51] Int. Cl. .......... H04b 1/10
[50] Field of Search .......... 328/165, 167, 159; 235/156

[56] References Cited

UNITED STATES PATENTS 3,281,700 10/1966 Young .......... 328/165
3,518,414 6/1970 Goodman et al. .......... 235/156 X
3,521,041 7/1970 Van Blerkom et al. .......... 328/165 X
3,521,042 7/1970 Van Blerkom et al. .......... 328/165 X

*Primary Examiner*—John S. Heyman
*Attorneys*—R. J. Guenther and William L. Keefauver

ABSTRACT: In a digital filter, arithmetic overflows are detected and their kind (whether positive or negative) determined by logical manipulation of the signs of the numeric quantities entering and leaving each arithmetic component of the filter. If net positive or negative overflow is detected, the final result of the filter operation is replaced by a positive or negative full scale numeric quantity, respectively, thereby preventing instability in the filter and suppressing output signal transients.

INVENTOR
L. B. JACKSON
BY Gerard E. Murphy
ATTORNEY

STABLE DIGITAL FILTER APPARATUS

BACKGROUND OF THE INVENTION

1. Field of the Invention

This invention relates to signal filtering apparatus and, more particularly, to discrete-time signal filters known as digital filters.

2. Description of the Prior Art

Digital filters and the techniques of digital filtering are subjects of much recent interest. A comprehensive treatment of digital filtering will be found in *Digital Processing of Signals* by B. Gold and C. M. Rader (McGraw-Hill, Inc., 1969). Several aspects of digital filtering particularly relevant to the instant invention are discussed in my jointly authored paper entitles "An Approach to the Implementation of Digital Filters" (L. B. Jackson, J. F. Kaiser, and H. S. McDonald, *IEEE Transactions on Audio and Electroacoustics*, Vol. AU–16, No. 3, Sept. 1968, pp. 413–421).

Digital filters accomplish many of the same tasks performed by conventional filters but do so by operating on digitized signal samples. Accordingly, digital filters have been found to offer many advantages over analog or continuous signal processing circuits. For example, digital filters lend themselves to multiplexing, i.e., the simultaneous use of a single digital filter to process signals derived from several sources. Another advantage of digital filtering is that the required circuits can be economically realized with solid state circuit elements, and so lend themselves to integrated circuit fabrication. In many applications the relatively large size and power requirements of comparable analog filters make digital filtering an attractive alternative.

Digital filters function by performing a series of arithmetic operations on signals, representative of digital quantities, presented to the filter one after another. Usually these digital quantities are expressed in some form of binary representation. Each sample must, of course, be of finite size. Efficient use of the filter circuit requires that no more binary places be used than will *usually* be necessary for satisfactory filter operation. It may happen, then, that under certain signal conditions, the required arithmetic operations will result in numeric quantities outside the preselected binary range of representation. This condition in a digital filter is commonly called overflow. Unless an overflow is cancelled by another simultaneously occurring overflow, the output of the filter will be in error for the cycle of filter operation in which overflow occured. Overflow in a particular cycle in the feedback loops of a filter of the general or recursive type also has adverse effects on the filter in succeeding cycles. Indeed, in some general or recursive filter configurations the nonlinearities that result from overflow can cause unwanted "oscillations" in the filter.

It is therefore an object of the present invention to suppress output signal transients caused by overflow in digital filters of all types. It is a further object of this invention to insure the stability of digital filters of the general and recursive types.

SUMMARY OF THE INVENTION

These and other objects are accomplished by detecting the occurrence of arithmetic overflow in a digital filter and replacing the incorrectly computed result with a quantity which insures the stability of the filter and/or suppresses output signal transients. More particularly, each of the arithmetic units of a digital filter has associated therewith logic circuits capable of detecting positive and negative overflow in the associated arithmetic unit. Responsive to these positive and negative overflow detecting logic circuits, additional logic circuitry determines the presence of a new positive or negative overflow in the filter considered as a whole. When a net positive or negative overflow occurs, a signal representing positive or negative full scale is substituted for the digital quantity computed by the filter.

Further features and objects of this invention, its nature, and various advantages, will be more apparent upon consideration of the attached drawings and he following detailed description of the invention.

DETAILED DESCRIPTION OF THE INVENTION

Figure 1:
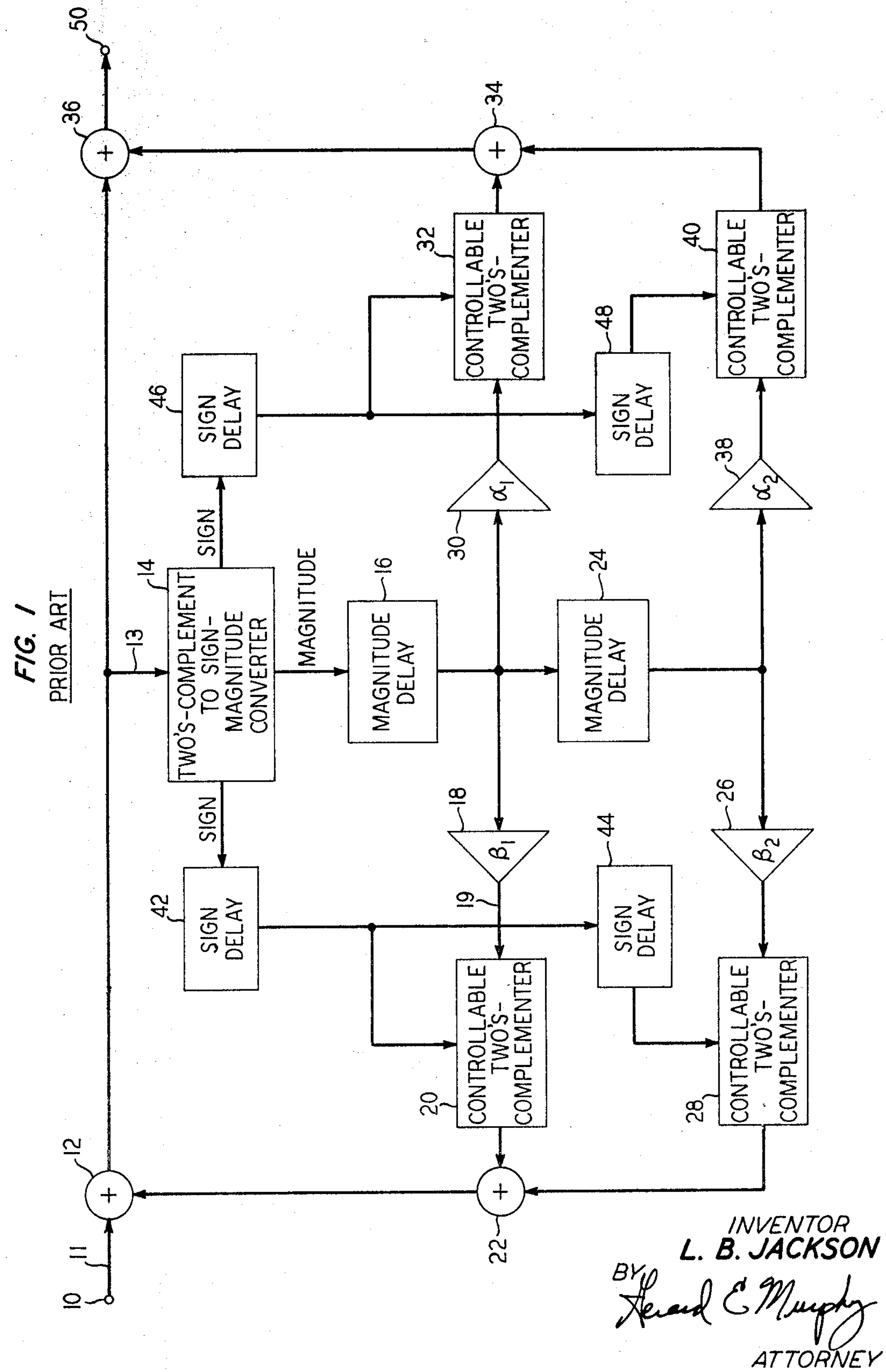
FIG. 1 PRIOR ART
FIG. 1 is a block diagram of a prior art general second order digital filter.

Digital filters process information by performing arithmetic operations on digitally coded samples of that information. In a majority of digital filter applications some form of binary coding of the samples to be processed is most convenient. Where binary coding is employed, each sample is represented by a series or group of ones and/or zeros, each digit corresponding electrically to the presence or absence of an electrical impulse or voltage of a particular value. Although the circuitry of a digital filter must be designed to process and does process these electrical signals, it is far more convenient to think of the filter as processing binary arithmetic quantities. Accordingly, filter operations in this specification will be discussed in terms of binary arithmetic operations on binary arithmetic quantities, it being understood that such quantities are actually represented in the filter by electrical signals and that the operations are performed by well-known electrical circuit components.

Particularly convenient for the arithmetic operations required in digital filtering is binary two's-complement coding. An extensive discussion of binary arithmetic in general and two's-complement arithmetic in particular will be found in Chapter 3 of *The Logic of Computer Arithmetic* by Ivan Flores (Prentice-Hall, Inc., 1963). In the binary two's-complement number system, if $n$ binary places are reserved for the representation of a sample, then $n-1$ places are used for the "-magnitude" of the sample and the $n$th, most significant, place is used for the "sign" of the quantity. Positive quantities, the magnitudes of which are within the range of representation by $n-1$ binary places, are expressed in the usual binary coding. A zero in the sign place indicates a positive quantity. A negative quantity, the magnitude of which is within this same range of representation, is expressed by inverting the $n$ bits of the corresponding positive quantity and adding binary 1 to the least significant place of the resulting binary number. Accordingly, a one in the sign place indicates a negative quantity.

One of the advantages of the two's-complement number system is that positive and/or negative numbers may be added together or subtracted from one another without consideration of their signs. Sign bits bits are treated like any other bits when these operations are performed. Thus, where five binary places are allowed for the representation of the magnitude of a quantity and a sixth (leftmost) place is used to represent the sign of a number, decimal +7 and decimal −5 would be added together in two's-complement arithmetic as follows:

000111

111011

000010. (1)

In the above example the binary result represents decimal +2, the correct result for the problem indicated.

Another arithmetic operation commonly required in digital filtering is multiplication, usually of vary data by a fixed filter coefficient. Binary multiplication is most conveniently performed when the multiplier and multiplicand quantities are both expressed in sign-magnitude rather than two's-complement notation. Accordingly, if data is in two's-complement notation, it must first be converted to sign-magnitude notation for multiplication and the product of the multiplication reconverted to two's-complement notation for further filter processing. Since positive numbers are represented identically in both these notations, it is only necessary to find the magnitude or absolute value of negative two's-complement data before multiplication and to two's-complement multiplier output products which are expected to be negative in sign (i.e., when the multiplier and multiplicand quantities are of unlike sign).

Filters employing these concepts may, of course, be constructed in any configuration. As an example, consider the general prior art second order filter of FIG. 1. Digitally coded samples of the signal to be processed are applied in two's-complement form to terminal 10 and, by way of lead 11, to adder 12. The quantities represented by the signal emanating from adder 12 are converted by converter 14 from two's-complement to sign-magnitude form for use in multipliers 18, 26, 30, and 38. The signs of these quantities are directed by converter 14 to sign delay units 42 and 46 while their magnitudes are directed to magnitude delay unit 16. Magnitude delays 16 and 24 sequentially delay the magnitude signals generated by converter 14. The coefficients of the filter transfer function denominator are introduced by multipliers 18 and 26 which respectively multiply the signals emanating from magnitude delays 16 and 24 by the magnitudes of coefficients $\beta_1$ and $\beta_2$. The multiplied signals are restored to two's-complement form by controllable two's-complement 20 and 28. Assuming the coefficients $\beta_1$ and $\beta_2$ to be positive quantities, this restoration to two's-complement form is accomplished by two's-complementing products formed from what was originally (i.e., on lead 13) negative data. Otherwise no action need be taken by controllable two'complementers 20 and 28. Accordingly, the signs of data on lead 13, extracted by converter 14, are suitably delayed in sign delays 42 and 44 nd sequentially applied to controllable two's-complementers 20 and 28. If negative values for coefficients $\beta_1$ and $\beta_2$ are a possibility, the signs of multiplier products must be determined from the signs of both the data on lead 13 and the relevant coefficient (e.g., by considering the least significant place of the binary sum of these signs). Finally, the signals emanating from controllable two's-complementers 20 and 28 are algebraically combined by means of adders 12 and 22 with the samples applied to terminal 10.

As is well known, the delay intervals introduced by magnitude delay units 18 and 26 must be such that signals processed in the loops of the filter are available for combination with successive input samples. In particular, the quantity represented by the signal emanating from adder 12 during any sample interval *m* must be processed in the loop including multiplier 18 and available for combination with the sample applied to terminal 10 during interval $m+1$. That same quantity must also be processed in the loop including multiplier 26 and available for combination with the sample applied to terminal 10 during interval $m+2$. Since, as discussed above, sign bit information is temporarily separated from magnitude information for purposes of multiplication, sign delay units 42 and 44 are required to delay sign bit information by intervals determined by considerations similar to those governing the choice of the magnitude delay intervals.

The portion of the digital filter of FIG. 1 thus far described is a conventional recursive second order digital filter. As is further shown in FIG. 1, a second order filter may include feedforward as well as feedback loops. In that event, the coefficients of the numerator of the filter transfer function are contributed by multipliers 30 and 38 which multiply the various signals applied thereto by coefficients $\alpha_1$ and $\alpha_2$, respectively. These multiplied signals are algebraically combined in adders 34 and 36 to develop the discrete-time filtered signal applied to terminal 50.

Digital filters like the one shown in FIG. 1 may, of course, be constructed to accept and process the binary digits or "-bits" of a given binary coded sample either serially or in parallel. Accordingly, leads typified by leads 11 and 13, are either a group of wires, one for each binary place, in the case of parallel operation or a single line in the case of serial operation. Similarly, the components of the filter (e.g. adders, multipliers, delays, etc.) may be constructed to operate either on serial or parallel data. Suitable serial adders, multipliers, and controllable two's-complementers are shown in my above-cited IEEE article. Sign and magnitude delays may be shift registers. Conversion from two's-complement to sign-magnitude notation may be accomplished by suitable logic circuitry in any well-known manner. Timing apparatus has not been shown since the structure and arrangement of such apparatus is well known in the digital filtering art.

Regardless of the binary coding system employed, the number of binary places which may be devoted to the representation of any sample is necessarily a constant, *n*, determined by such considerations as the rate at which samples must be taken to derive an accurate digital representation of the original signal, the speed at which bits can be processed by the circuitry, and the efficient use of the digital filter employed. As has been mentioned, it will usually not be economical to use more places than will *normally* be required for satisfactory filter operation.

A property of number systems in general and the binary two's-complement number system in particular is that, where no more than a fixed number of places, e.g., *n*, is allowed for the representation of a quantity and where, as in digital filter operations, fixed point arithmetic must be used, the *most significant* places of numbers too large for representation within the allotted number of places are lost. This results in an extreme nonlinearity in the number system whenever unusually large quantities occur. As an example of this nonlinearity, consider the two's-complement number system of the preceding example. The largest positive number which can be represented in a two's-complement number system with $n=6$ is binary 011111 or decimal +31. If binary 000001 (decimal +1) is added to binary 011111, as in the following computation, $$\begin{array}{r} 011111 \\ 000001 \\ 100000, \end{array} \qquad (2)$$

the binary results in the two's-complement equivalent of decimal −32. Two positive numbers have been added together to produce a grossly erroneous negative result because the correct positive result is a number outside the range of representation in the chosen number of two's-complement binary places. Similar nonlinearities occur when the product of a multiplication is outside the range of representation.

Figure 5A:
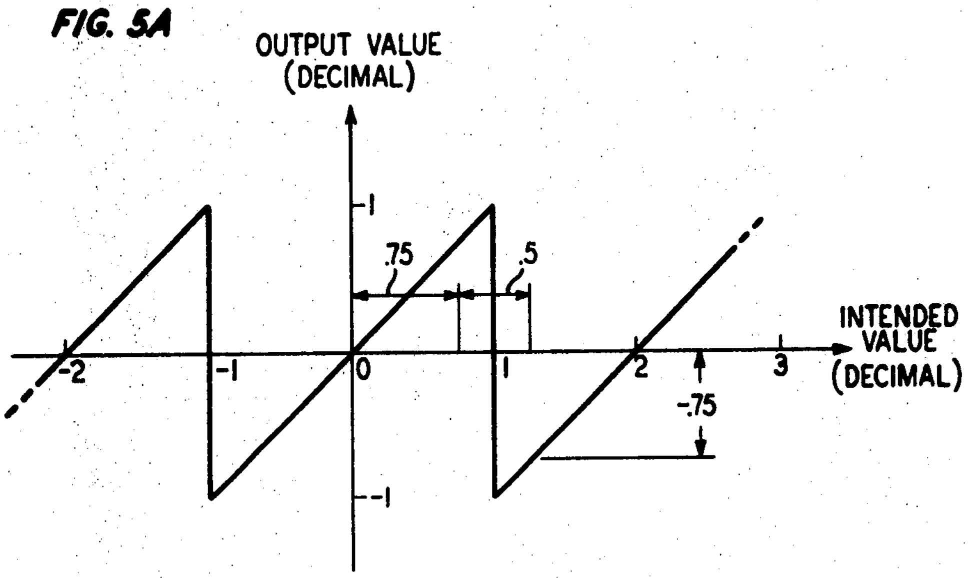
FIG. 5A illustrates the nonlinearity exhibited by prior art digital filters.
Figure 5B:
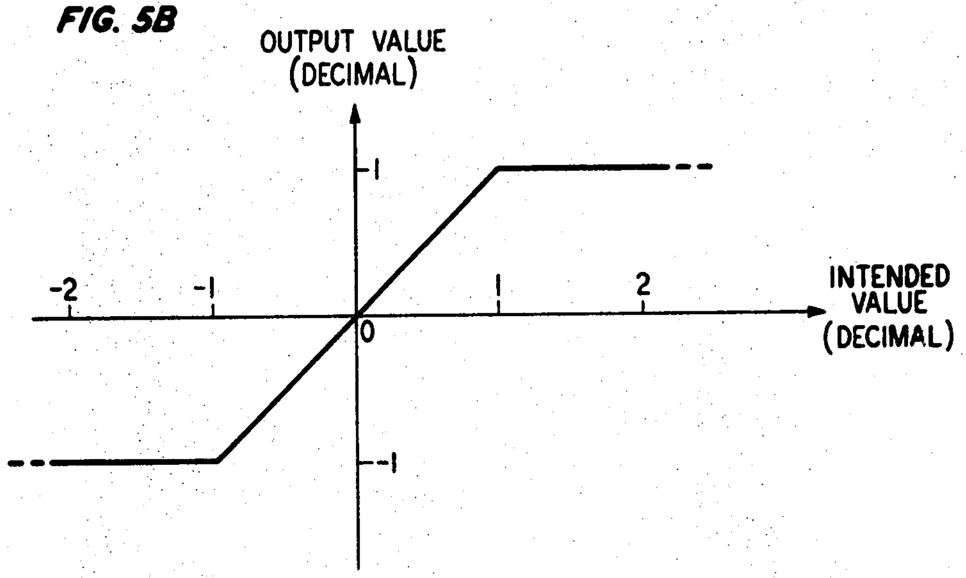
FIG. 5B illustrates the saturation arithmetic which insures stable behavior in a recursive second order digital filter of the type shown in FIG. 2.

The nonlinearity of two's-complement binary arithmetic can be conveniently generalized beyond the choice of any particular value of *n* if a binary point (equivalent to the decimal point) is placed between the sign bit and the most significant magnitude bit. In that event only quantities between decimal +1 (exclusive) and decimal −1 (inclusive) can be represented and the nonlinearity of the number system may be graphically portrayed as in FIG. 5A. This figure suggests that if, for example, the two's-complement binary equivalent of adding decimal +0.75 to decimal +0.5 is performed, the result will be the binary equivalent of decimal −0.75 which is, of course, erroneous. An arithmetic unit (e.g., adder or multiplier) in which such an arithmetic operation has taken place may be said to have overflowed, i.e., attempted to produce a result outside the chosen range of numeric representation. A "negative" overflow occurs when the intended result is a negative quantity too large for representation; a "positive" overflow occurs when the intended result is a positive number similarly too large.

In digital filters like that shown in FIG. 1 (though not necessarily of second order), an arithmetic overflow in an adder (e.g., adder 12) can occur only when the signs of the addends (i.e., the quantities applied to the adder) are of the same sign. by no means will overflow occur every time the addends are of like sign, but should overflow occur when two's-complement arithmetic is used, it ill be evident from the fact that the sign of the sum will be logically inconsistent with the common sign of the addends. Computation (2) above is an example of positive overflow in an adder like adder 12. In that example two positive quantities were added to produce an erroneous negative result. With respect to multipliers (e.g., multiplier 18) on the other hand, overflow can occur in only those multipliers with coefficients (e.g. $\beta_1$) larger in absolute value than decimal 1. If for any such multiplier, the filter coefficient is also less than decimal 2 in absolute value, overflow occurring in a multiplier capable of multiplying two positive quantities will always result in a negative rather than the normal positive product (e.g., the quantity on lead 19 will be negative rather than an positive as is normal). The actual kind of overflow in this type of multiplier can be determined from the intended sign of the product or, assuming the coefficient (e.g., $\beta_1$) to be positive, from the sign of the data before its conversion to sign magnitude notation.

It is readily apparent from the foregoing discussion that an arithmetic overflow occurring in the feedback loops of a digital filter having such loops will, unless cancelled by simultaneously occurring overflow of opposite sign, render the quantity computed in the recursive portion of the filter grossly incorrect. Not only will the output quantity of the recursive portion of the filter be in error in the filter cycle in which overflow occurs, but that error will be recirculated in the feedback loops to the degradation of computations in succeeding cycles. Depending on the filter coefficients and the order of the filter, the recursive portion of a digital filter may even be so unstable as to oscillate or continue to produce erroneous results indefinitely once overflow has occurred.

Arithmetic overflow occurring in the feedforward loops of a digital filter having such loops will, unless cancelled by a simultaneously occurring overflow of opposite sign, similarly render the quantity computed in the nonrecursive portion of the filter erroneous. In the case of the feedforward or nonrecursive portion, however, an error once computed has no effect on future computations. Such an overflow error may, however, constitute an undesirable output signal transient.

These deleterious effects of arithmetic overflow in digital filters may be overcome in accordance with the principles of Binary invention by including in a filter logic circuitry selectively responsive to signal conditions in each of the arithmetic units of the filter wherein arithmetic overflow can occur. When two's-complement arithmetic is used, this logic sign-magnitude may for arranged to detect a logical inconsistency in the signs of the quantities entering and leaving the associated arithmetic unit. As discussed above, such inconsistency is indicative of arithmetic overflow in the unit. Additional logic circuitry, responsive to signals from the aforementioned logic circuitry, determines the presence and kind of a net overflow occuring in the filter. When a new overflow is indicated by the latter logic circuitry, corrective or remedial action is taken to preserve the stability of the filter and/or to suppress output signal transients.

Figure 2:
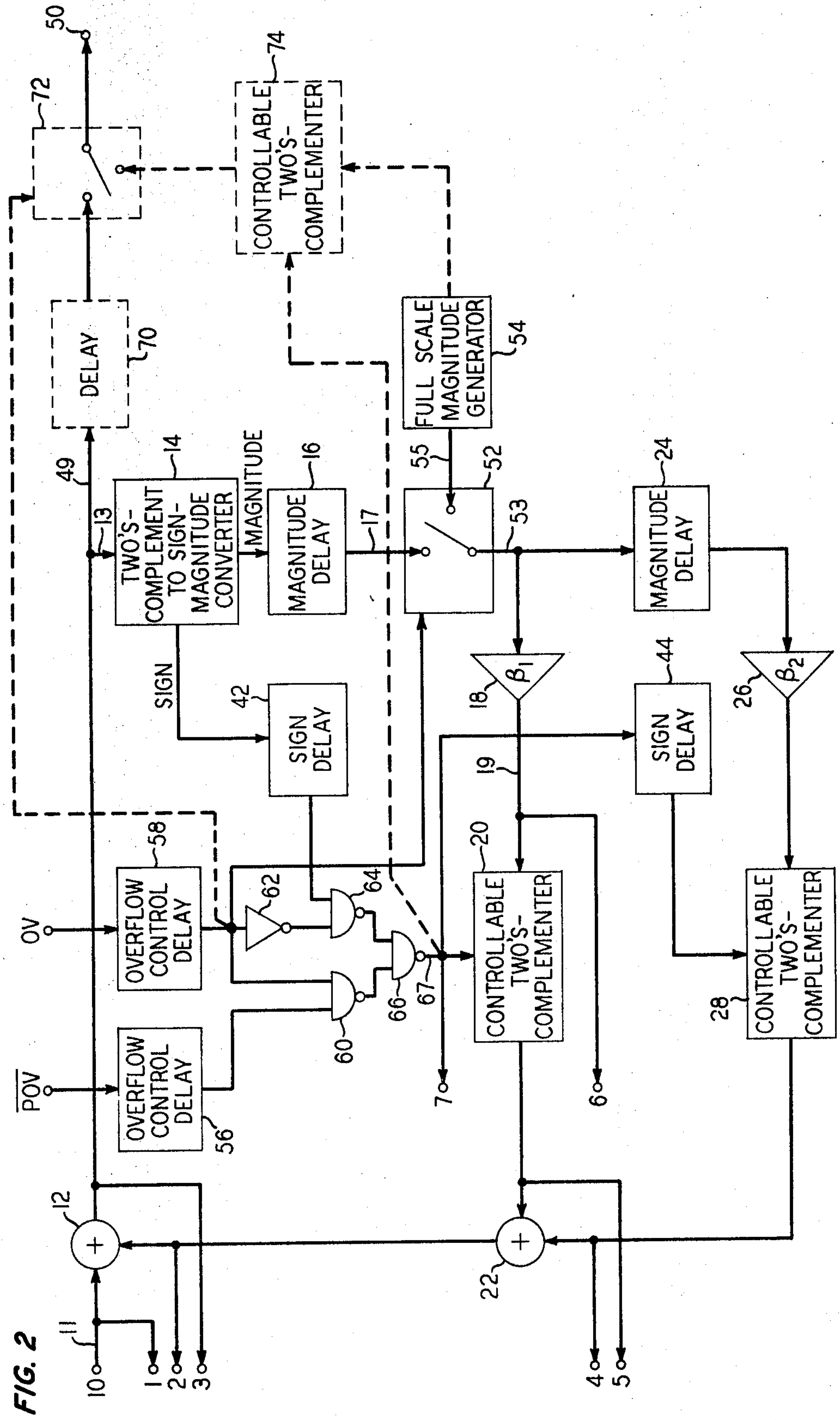
FIG. 2 is a block diagram of the recursive portion of the second order digital filter of FIG. 1 modified in accordance with the principles of this invention.

As an example of the application of the principles of this invention to a digital filter of a particular configuration, consider the feedback or recursive portion of the second order digital filter of FIG. 1 shown in FIG. 2, If filter coefficient $\beta_2$ is assumed to be a positive number less than decimal 1, arithmetic overflows of the kind described above can only occur in adder 12, adder 22, and multiplier 18. Overflow cannot occur in multiplier 26 because the above assumption about the range of coefficient $\beta_2$ constrains the output product of multiplier 26 to being a quantity whose magnitude is always smaller than the input quantity.

Figure 4:
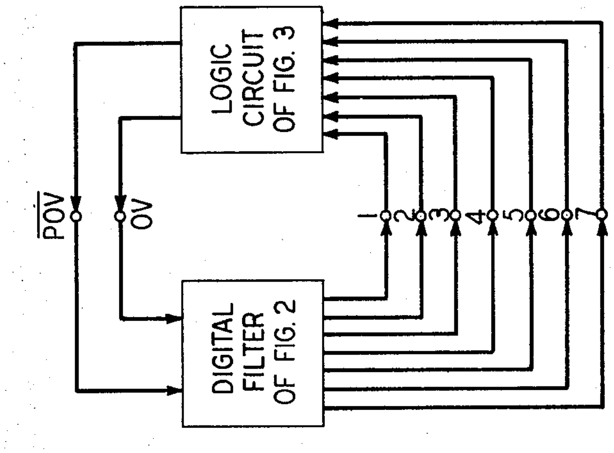
FIG. 4 shows the interconnection of the apparatus of FIG. 2 and the circuitry of FIG. 3.

Since overflow in adder 12, adder 22, or multiplier 18 may be detected by comparing the sign of the quantity or quantities entering the arithmetic device with the sign of the quantity leaving that device, the sign bits on leads to and from each of these devices are applied to a logic circuit (shown in FIG. 3) which is capable of determining the presence and kind of any net overflow in the filter by logical manipulation of these sign bits. The required sign bits are made available to the logic circuit of FIG. 3 by connecting the appropriate leads of the filter to terminals 1 trough 7 of FIG. 2. As shown in FIG. 4, the logic circuitry of FIG. 3 may then be connected to the filter of FIG. 2 at these terminals. Similarly numbered terminals in FIG. 3 have common connections. Where parallel operation is being implemented, only the sign bit connection of each lead need be tapped to terminals 1 through 7. Where serial operation is the desired mode, the connections to terminals 1 through 7 or the logic circuitry itself need only be enabled when sign bits are on the tapped leads. This may be accomplished conventionally, by including gates in each of the connections to terminals 1 though 7 in FIG. 2 and enabling those gates only during the sign bit intervals.

Figure 3:
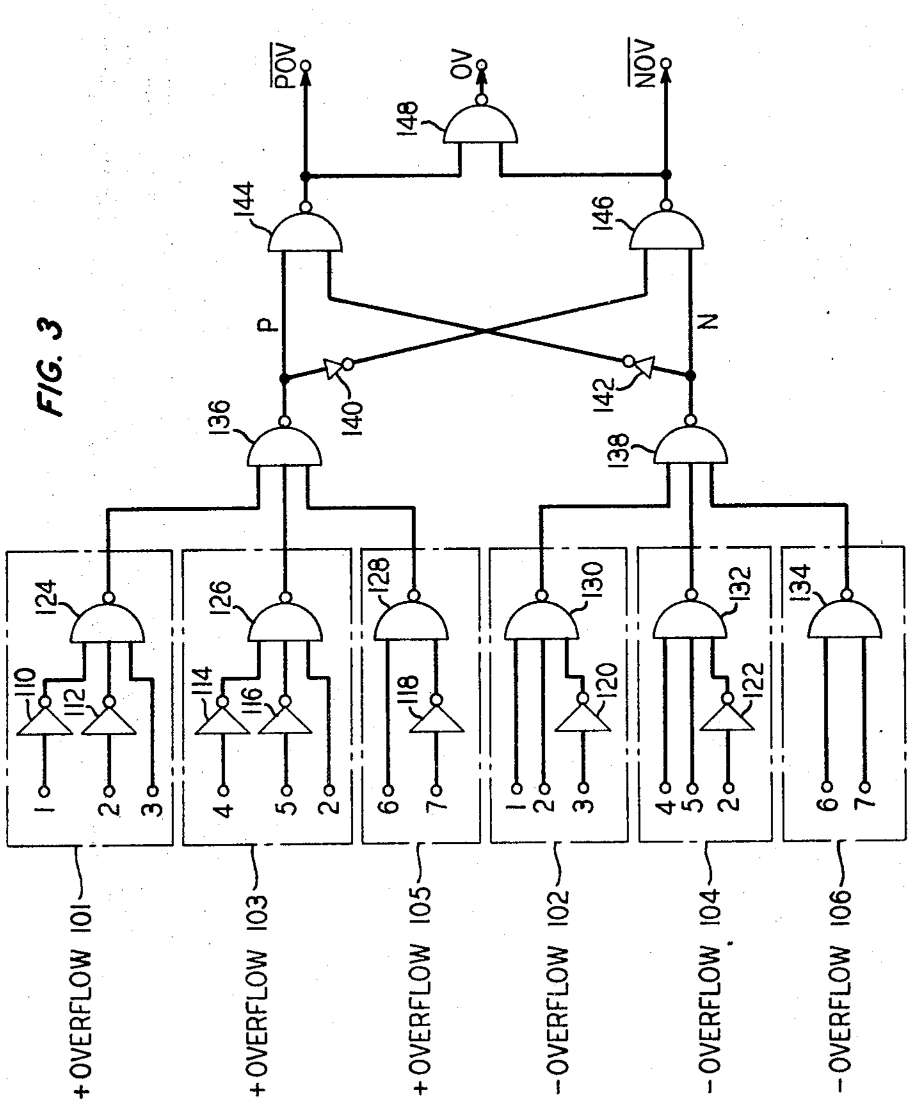
FIG. 3 depicts logic circuitry used for the detection of arithmetic overflows in the digital filter of FIG. 2.

In the logic circuit of FIG. 3, overflow in adder 12 is determined by logical comparison of sign bits applied to terminals 1, 2, and 3. Sign bits applied to terminals 1 and 2 are inverted by inverters 110 and 112 of apparatus 101, respectively, and applied to NAND-gate 124 along with the sign bit applied to terminal 3. NAND-gate 124 produces an output signal representative of binary 1 unless all the signals applied to it are binary 1. Accordingly, the circuitry of FIG. 3 enclosed by broken line 101 constitutes what may be called a local positive overflow detecting logic circuit for detecting positive overflow in adder 12. Logic circuit 101 is arranged to produce an output representative of binary 0 whenever a positive overflow occurs in adder 12, that is, when the sign bits of quantities applied to adder 12 are 0 but the sign bit of the quantity emanating from adder 12 is 1.

In local negative overflow detecting logic circuit 102 the sign bit applied to terminal 3 is inverted by inverter 120 and applied to NAND-gate 130 along with the sign bits applied to terminals 1 and 2. NAND-gate 130, similar to NAND-gate 124, produces an output signal representative of binary 1 unless all the signals applied to it are binary 1. Thus local negative overflow detecting logic circuit 102 produces an output signal representative of binary 0 whenever a negative overflow occurs in adder 12, that is, when the sign bits of quantities applied to adder 12 are 1 but the sign bit of the quantity emanating from adder 12 is 0.

Local positive overflow detecting circuit 103 and local negative overflow detecting circuit 104, associated with adder 22, are identical in purpose and structure to local overflow detecting circuits 101 and 102, associated with adder 12. Sign bits applied to terminals 4 and 5 are inverted by inverters 114 and 116 of apparatus 103 and applied to NAND-gate 126 along with the sign bit applied to terminal 2. Apparatus 103 is therefore a logic circuit uniquely responsive to a positive overflow occurring in adder 22. Similarly, the sign bit applied to terminal 2 is inverted by inverter 122 of apparatus 104 and applied to NAND-gate 132 along with the sign bits applied to terminals 4 and 5. Apparatus 104 is therefore a logic circuit uniquely responsive to a negative overflow occurring in adder 22.

Local overflow detecting circuits 105 and 106 are similarly associated with multiplier 18. The sign of a quantity to be multiplied by positive filter coefficient $\beta_1$ is extracted as that quantity is processed by converter 14. That sign bit is delayed by sign delay unit 42 until needed at controllable two's-complementer 20 and normally applied unaltered by NAND-gates 64 and 66 to that device. In accordance with the foregoing discussion of multiplier overflow, the sign bit on lead 10 should be positive. A negative sign on lead 19 (and therefore at terminal 6) indicates overflow in multiplier 18. The sign bit on lead 67 (and hence at terminal 7) determines whether that multiplier overflow should be interpreted as positive or negative.

Accordingly, in local positive overflow detecting logic circuit 105 the sign bit applied to terminal 7 is inverted by inverter 118 and applied to NAND-gate 128 along with the sign bit applied to terminal 6. Thus local positive overflow detecting logic circuit 105 produces an output signal representative of binary 0 whenever a positive overflow occurs in multiplier 18, that is, whenever the sign bit on lead 19 is a 1 and the sign bit on lead 67 is a 0. Likewise, in local negative overflow detecting logic circuit 106 the sign bit applied to terminal 6 is applied to NAND-gate 134 along with the sign bit applied to terminal 7. LOcal negative overflow detecting logic circuit 106 therefore produces an output signal representative of binary 0 whenever a negative overflow occurs in multiplier 18, that is, whenever the sign bit on lead 19 is a 1 and the sign bit on lead 67 is also a 1.

In the normal operation of the digital filter of FIG. 2, overflows are a common occurrence. Those overflows are, however, usually self-cancelling and produce no net error. Indeed, in the recursive second order filter of FIG. 2 any simultaneous positive and negative overflows will cancel one another. It is therefore necessary to take corrective action only when a net positive or negative overflow occurs. Accordingly, the output signals from all local positive overflow detecting logic circuits (i.e., circuits 101, 103, 105) are applied to NAND-gate 136 which produces an output signal representative of binary 1 when any one or more local positive overflow circuits indicates a local positive overflow. Likewise, NAND-gate 138, responsive to the output signals of local negative overflow detecting circuits 102, 104, and 106, produces an output signal representative of binary 1 when any one or more local negative overflow circuits indicates a local negative overflow.

The output signal of NAND-gate 136 is applied to NAND-gate 144 along with the output signal of NAND-gate 138 inverted by inverter 142. Accordingly, NAND-gate 144 produces an output signal representative of binary 0, applied to terminal $\overline{POV}$, when a positive overflow occurs in the absence of any cancelling negative overflow. Similarly, NAND-gate 146, responsive to the output of NAND-gate 138 and the output of NAND-gate 136 inverted by inverter 140, produces an output signal representative of binary 0, applied to terminal $\overline{NOV}$, when a negative overflow occurs in the absence of a cancelling positive overflow.

Finally, NAND-gate 148, responsive to the output signals of NAND-gate 144 and 146, produces an output signal, applied to terminal OV, representative of binary 1 when the output signal of either gate 144 or gate 146 indicates the presence of either a net positive or negative overflow in the recursive portion of the filter considered as a whole.

In the filter of FIG. 2 stability can be insured if, whenever a net positive overflow occurs, a number representative of positive full scale is substituted for the value computed by the filter and if, whenever negative overflow occurs, a number representative of negative full scale is similarly substituted. The substitution must be such that the value computed by the filter under a condition of net overflow is not recirculated by the filter. Instead the computed value is discarded and the appropriate full scale value is recirculated in its place. A mathematical proof that this results in a stable recursive second order filter may be found in an article by P. M. Ebert, J. E. Mazo, and M. G. Taylor entitled "Overflow Oscillations in Digital Filters" (The Bell System Technical Journal, Vol. 48, No. 9, Nov. 1969, p. 2,999 et seq.).

Since the presence and kind of any net overflow is determined by the signals applied to terminals OV, $\overline{POV}$, and $\overline{NOV}$, sufficient information is available at these terminals to determine the kind of corrective action required to insure stability in the filter. Accordingly, overflow control signals applied to terminals OV and $\overline{POV}$ of FIG. 3 are conveyed to similarly designated terminals in FIG. 2 as shown in FIG. 4. Signals applied to terminal $\overline{NOV}$ are redundant in this case and therefore need not be utilized. Signals applied to terminals OV and $\overline{POV}$ are delayed by overflow control delays units 56 and 58, respectively. The output signal of delay unit 58 is directed to switch 52, normally positioned to connect leads 17 and 53, in time to change the state of switch 52 to connect lead 55 to lead 53. By this means a positive full scale magnitude value generated by full scale generator 54 is introduced in the feedback loops in lieu of the incorrect value computed in the filter cycle wherein a net overflow occurred. Where the filter is designed to operate in the parallel mode, the full scale value thus introduced will comprise binary ones on all magnitude leads. For serial operation, full scale generator 54 generates a series of binary ones representing a full scale magnitude. Full scale generator 54 may therefore be any suitable binary signal generator. Switch 52 may be any suitable electronic switch.

Since the signal applied to terminal $\overline{POV}$ is 0 when a net positive overflow has occurred and 1 when a net negative overflow has occurred, that signal represents the sign to be associated with the full scale magnitude value introduced by way of switch 52. Accordingly, the output signal of delay unit 58, inverted by inverter 62, is applied to NAND-gate 64, thereby disabling the path by which the sign of data appearing on lead 13 is normally applied to controllable two's-complementers 20 and 28. Instead, the output signal of delay unit 58 enables NAND-gate 60, thereby allowing the output signal of delay unit 56, also applied to NAND-gate 60, to be applied to controllable two's-complementers 20 and 28. By this means controllable two's-complementers 20 and 28 associate the correct sign with the full scale value impressed on the circuit as discussed above.

If it is desired that the digital filter of FIG. 2, stabilized in accordance with the foregoing discussion, also be arranged to suppress the output signal transients occasioned by arithmetic overflow, the output value of the filter may also be clamped to positive or negative full scale when net overflow occurs. This may be accomplished as shown in broken lines in FIG. 2 by introducing an appropriate delay in lead 49 and providing for the substitution of positive or negative full scale in a manner similar to that discussed above. In particular, the required delay in lead 49 may be realized by means of delay unit 70. When a net overflow in the digital filter is indicated, switch 72, normally arranged to connect lead 49 and terminal 50, responds to the overflow indicating output signal of delay unit 58 by switching to connect terminal 60 to full scale magnitude generator 54 through controllable two s-complementer 74. Controllable two's-complementer 74, responsive to the sign bit on lead 67, two's-complements the positive full scale signal from generator 54 if the sign bit on lead 67 indicates that a negative full scale quantity should be applied to terminal 50. Otherwise two's-complementer 74 passes the full scale signal from generator 54 unaltered. Accordingly, this additional apparatus serves to discard any incorrectly computed value, captured in delay unit 70, and to substitute therefor a positive or negative full-scale saturation value. Thus, output signal transients occasioned by overflow in the filter are suppressed.

The additional components required for output signal transient suppression are all similar to components already discussed: delay unit 70 is similar to magnitude delay units 16 and 24; switch 72 is similar to switch 52; and controllable two's-complementer 74 is similar to controllable two's-complementers 20 and 28.

It is understood that the embodiments shown and described herein are illustrative of the principles of this invention only. In particular, the principles of this invention are applicable to digital filters of any order and configuration. It is to be further understood that modifications may be implemented by those skilled in the art without departing from the spirit and scope of the invention. For example, negative as well as positive filter coefficients may be used as has been discussed. Similarly, other forms of coding may be used wherein overflow is indicated by local nonlinearities other than logical inconsistency of signs.

What is claimed is:

1. A stable digital filter for processing an input signal, comprising:

adder means for developing an output signal proportional to the sum of the applied signals;

delays means for delaying the output signal of said adder means for a predetermined interval of time;

multiplier means for multiplying the output signal of said delay means by a predetermined filter coefficient;

means for applying said multiplied signal and an input signal to said adder means;

overflow detecting means responsive to signal conditions in said adder means and said multiplier means for detecting an arithmetic overflow in said filter; and stabilizing means responsive to said overflow detecting means for altering said processed signal to stabilize said filter when an arithmetic overflow is indicated by said overflow detecting means.

2. The digital filter of claim 1 wherein said overflow detecting means comprises:

first logic means responsive to the signs of the arithmetic quantities represented by said output signal of said adder means and by the output signal of said multiplier for detecting a logical inconsistency in said signs and for producing output signals indicative of the presence of overflow in said multiplier as indicated by said logical inconsistency.

3. The digital filter of claim 2 wherein said overflow detecting means, further comprises:

second logic means responsive to the signs of the arithmetic quantities represented by said signal applied to said digital filter, by said multiplied signal, and by said output signal of said adder for detecting a logical inconsistency in said signs and for producing output signals indicative of the presence of overflow in said adder as indicated by said logical inconsistency.

4. The digital filter of claim 3 wherein said overflow detecting means further comprises:

third logic means responsive to said output signals of said first and second logic means for producing an output signal indicative of the presence of a net overflow in said filter.

5. The digital filter of claim 4 wherein said stabilizing means comprises:

means responsive to the output signal of said third logic means for substituting for the output signal of said delay means a signal representative of the largest arithmetic quantity within the capacity of said filter.

6. A stable digital filter for processing a two's-complement binary coded applied signal comprising:

at least one recirculating signal processing loop including adder means for adding said applied signal and a recirculated signal, converter means responsive to the output signal of said adder for developing output signals representative of the sign and magnitude of the arithmetic quantity indicated by said adder output signal, first delay means for delaying the output signal of said converter means representative of said magnitude for a predetermined interval of time, second delay means for delaying the output signal of said converter means representative of said sign for said predetermined interval of time, multiplier means for multiplying said delayed magnitude signal by a predetermined coefficient, two's-complementation means responsive to said delayed sign signal for producing an output signal representative of the two's-complement of the arithmetic quantity represented by the output signal of said multiplier, and means for applying the output signal of said two's-complementation means to said adder as said recirculated signal;

overflow detecting means responsive to the signs of said representative signals applied to and produced by said adder and said multiplier for detecting a logical inconsistency in said signs indicative of an overflow condition in said filter; and stabilizing means responsive to said overflow detecting means for stabilizing said filter,

7. The digital filter of claim 6 wherein said overflow detecting means comprises:

first logic means responsive to said multiplier output signal and to the output signal of said second delay means for producing output signals indicative of the presence and sign of overflow in said multiplier;

second logic means responsive to said applied signal, said recirculated signal, and said adder output signal for producing output signals indicative of the presence and sign of overflow in said adder; and third logic means responsive to said output signals of said first and second logic means for producing output signals indicative, respectively, of the presence and sign of a net overflow in said filter.

8. The digital filer of claim 7 wherein said stabilizing means comprises:

means responsive to the output signal of said third logic means indicative of the presence of a net overflow in said digital filter for substituting for the output signal of said first delay means a signal representative of the magnitude of the largest arithmetic quantity within the capacity of said filter; and means responsive to the output signal of said third logic means indicative of the presence of a net overflow in said digital filter for inhibiting the output signal of said second delay means for applying the output signal of said third logic means indicative of the sign of said net overflow to said two's-complementation means.

9. The digital filter of claim 7 wherein said first logic means comprises:

first and second logical NAND circuits for developing output signals indicative of a positive or negative overflow, respectively, in said multiplier;

means for applying to said first and second logical NAND circuits that part of said multiplier output signal representing the sign of the arithmetic quantity represented by said output signal;

means for applying to said first logical NAND circuit an inverted replica of the output signal of said second delay means; and means for applying the output signal of said second delay means to said second logical NAND circuit.

10. The digital filter of claim 9 wherein said second logic means comprises:

third and fourth logical NAND circuits for developing output signals indicative of a positive or negative overflow, respectively, in said adder;

means for applying to said third logical NAND circuit inverted replicas of that part of each of said applied and recirculated signals representing the signs of the arithmetic quantities represented by said signals;

means for applying to said third logic NAND circuit that part of said adder output signal representing the sign of the arithmetic quantity represented by said signal;

means for applying to said fourth logical NAND circuit that part of each of said applied and recirculated signals representing the signs of the arithmetic quantities represented by said signals; and means for applying to said fourth logical NAND circuit an inverted replica of that part of said adder output signal representing the sign of the arithmetic quantity represented by said signal.

11. The digital filter of claim 10 wherein said third logic means comprises:

a fifth logical NAND circuit responsive to the output signals of said first and third logical NAND circuits for developing an output signal indicative of a positive arithmetic overflow occurring in either of said adder or said multiplier;

a sixth logical NAND circuit responsive to the output signals of said second and fourth logical NAND circuits for developing an output signal indicative of a negative arithmetic overflow occurring in either of said adder or said multiplier;

seventh and eighth logical NAND circuits for developing output signals indicative of net positive or net negative overflow, respectively, in said filter;

means for applying to said seventh logical NAND circuit the output signal of said fifth logical NAND circuit;

means for applying to said seventh logical NAND circuit an inverted replica of the output of said sixth logical NAND circuit;

means for applying to said eighth logical NAND circuit the output signal of said sixth logical NAND circuit; circuit;

means for applying to said eighth logical NAND circuit an inverted replica of the output signal of said fifth logical nAND circuit;

a ninth logical NAND circuit for developing an output signal when either a net positive or net negative overflow occurs in said digital filter; and means for applying the output signals of said seventh and eighth NAND circuits to said ninth logical NAND circuit.

12. Apparatus for detecting arithmetic overflow oscillations in a digital filter, said filter including arithmetic units for operating on signals representative of arithmetic quantities, comprising:

positive and negative overflow detecting logic circuits connected to the input and output leads of each of said arithmetic units wherein a positive or negative arithmetic overflow can occur, each generating an output signal indicative of a logical inconsistency in the sign of the arithmetic quantity generated by said arithmetic unit and the signs of said arithmetic quantities operated upon by said arithmetic unit; and means responsive to said output signals of said positive and negative overflow detecting logic circuits for producing signals indicative of the presence and polarity of a net positive or a net negative overflow of said digital filter.

13. Apparatus for preventing overflow oscillations in a recursive digital filter, said filter including arithmetic units for operating on signals representative of arithmetic quantities, comprising:

positive and negative overflow detecting logic circuits connected to the input and output leads of each of said arithmetic units wherein a positive or negative arithmetic overflow can occur, each generating an output signal indicative or a logical inconsistency in the sign of the arithmetic quantity generated by said arithmetic unit and the signs of said arithmetic quantities operated upon by said arithmetic unit;

means responsive to said overflow signals of said positive and negative overflow detecting logic circuits for producing overflow control signals indicative of the presence and polarity of a net positive or a net negative overflow in said digital filter; and means for substituting for the arithmetic quantity computed by the filter the largest positive or negative arithmetic quantity within the capacity of said digital filter when a net positive or net negative overflow, respectively, is indicated by said overflow control signals.

14. Apparatus for suppressing transients in the arithmetic quantities computed by a digital filter, said filter including arithmetic units for operating on signals representative of arithmetic quantities, comprising:

positive and negative overflow detecting logic circuits connected to the input and output leads of each of said arithmetic units wherein a positive or negative arithmetic overflow can occur, each generating an output signal indicative of a logical inconsistency in the sign of the arithmetic quantity generated by said arithmetic unit and the signs of said arithmetic quantities operated upon by said arithmetic unit;

means responsive to said output signals of said positive and negative overflow detecting logic circuits for producing overflow control signals indicative of the presence and polarity of a net positive or a net negative overflow in said digital filter; and means for substituting for the arithmetic quantity computed by the filter the largest positive or negative arithmetic quantity within the capacity of said digital filter when a net positive or net negative overflow, respectively, is indicated by said overflow control signals.

15. Apparatus for detecting arithmetic overflow in a digital filter, said filter having arithmetic units including adders and multipliers, comprising:

positive overflow detecting means associated with at least one of said arithmetic units wherein a positive arithmetic overflow may occur, each of said positive overflow detecting means being a logic circuit for producing an output signal when the sign of the numerical quantity leaving said arithmetic unit is logically inconsistent with the presence of applied numerical quantities of positive sign;

negative overflow detecting means associated with at least one of said arithmetic units wherein a negative arithmetic overflow may occur, each of said negative overflow detecting means being a logic circuit for producing an output signal when the sign of the numerical quantity leaving said arithmetic unit is logically inconsistent with the presence of applied numerical quantities of negative sign;

overall positive overflow detecting means responsive to the output signals of said positive overflow detecting means for producing an output signal when one or more of said positive overflow detecting means indicates a positive overflow; and overall negative overflow detecting means responsive to the output signals of said negative overflow detecting means for producing an output signal when one or more of said negative overflow detecting means indicates a negative overflow.

16. Apparatus for stabilizing a digital filter, said filter having at least one recirculating signal processing loop including arithmetic units, comprising:

positive overflow detecting means associated with at least one of said arithmetic units wherein a positive arithmetic overflow may occur, each of said positive overflow detecting means being a logic circuit for producing an output signal when the sign of the numerical quantity leaving said arithmetic unit is logically inconsistent with the presence of applied numerical quantities of positive sign; negative overflow detecting means associated with at least one of said arithmetic units wherein a negative arithmetic overflow may occur, each of said negative overflow detecting means being a logic circuit for producing an output signal when the sign of the numerical quantity leaving said arithmetic unit is logically inconsistent with the presence of applied numerical quantities of negative sign;

overall positive overflow detecting means responsive to the output signals of said positive overflow detecting means for producing an output signal when one or more of said positive overflow detecting means indicates a positive overflow;

overall negative overflow detecting means responsive to the output signals of said negative overflow detecting means for producing an output signal when one or more of said negative overflow detecting means indicates a negative overflow; and means for altering the signal in said recirculating loop to either a positive or negative full-scale numerical value when either a positive or a negative overflow is solely indicated, respectively, by said overall positive or negative overflow detecting means.

17. Apparatus for suppressing transients in the output signal of a digital filter, said filter having arithmetic units including adders and multipliers, for developing an output signal representative of a numerical quantity comprising:

positive overflow detecting means associated with at least one of said arithmetic units wherein a positive arithmetic overflow may occur, each of said positive overflow detecting mans being a logic circuit for producing an output signal when the sign of the numerical quantity leaving said arithmetic unit is logically inconsistent with the presence of applied numerical quantities of positive sign;

negative overflow detecting means associated with at least one of said arithmetic units wherein a negative arithmetic overflow may occur, each of said negative overflow detecting means being a logic circuit for producing an output signal when the sign of the numerical quantity leaving said arithmetic unit is logically inconsistent with the presence of applied numerical quantities of negative sign;

overall positive overflow detecting means responsive to the output signals of said positive overflow detecting means for producing an output signal when one or more of said positive overflow detecting means indicates a positive overflow, overall negative overflow detecting means responsive to the output signals of said negative overflow detecting means for producing an output signal when one or more of said negative overflow detecting means indicates a negative overflow; and means for altering said output signal of said digital filter to either a positive or negative full-scale numerical value when either a positive or a negative overflow is solely indicated, respectively, by said overall positive or negative overflow detecting means.